Patented Apr. 14, 1953

2,635,088

UNITED STATES PATENT OFFICE 2,635,088

POLYCHLOROPRENE-PHENOL-ALDEHYDE COMPOSITIONS

Robert L. Holmes, Naval Base, S. C., assignor to Raybestos-Manhattan, Inc., Passaic, N. J., a corporation of New Jersey No Drawing. Application January 16, 1951, Serial No. 206,303

4 Claims. (Cl. 260—43)

1

This invention relates to improvements in the production of polychloroprene (neoprene) compositions.

It is an object of the present invention to provide polychloroprene compositions which, in the uncured state, are soft, tend to form with ease and facility, and which may be processes similar to good processing natural rubber compounds.

It is a further object of the present invention to provide polychloroprene compositions which, in the cured state, have good aging properties and which may have a relatively wide range of hardness, similar to that of natural rubber compositions, from soft to hard, including rock-hard stocks which nevertheless are workable on conventional rubber working equipment.

Natural rubber, and some of the synthetic elastomers such as the butadiene-styrene and the butadiene-acrylonitrile copolymers, can be cured with sulfur to produce the so-called soft rubber cure typified by such articles as automobile tires, and the hard rubber cures typified by battery boxes. Even there, while intermediate hardness between those two extremes can be obtained by judicious use of various amounts of sulfur and/or loading with fillers, the use of intermediate amounts of sulfur between say 6 to 30%, results in poor aging stocks and finished articles. Polychloroprene may also be cured to the hard rubber state with sulfur, although the physical properties obtained are relatively poor compared to the soft rubber cure and the compounds so formed exhibit high water absorption. This marked increase in water absorption prevents this otherwise valuable polymer from being used in many instances, particularly in the electrical equipment field. Polychloroprene rubbers may be hardened to some degree by the use of fillers, such as carbon blacks, hard clays, etc., and by means of metallic oxide curing agents, such as zinc oxide and magnesium oxide.

With polychloroprene, the use of too high a loading to obtain hard stocks, produces stocks which scorch or setup in the factory and are, in general, unworkable. No rock-hard stocks can be obtained that are workable on conventional rubber equipment through the medium of loading agents or with the metallic oxide curing agents.

As distinguished from the foregoing, and in accordance with the present invention, I am able to produce polychloroprene compositions which, in the uncured state, are soft, tend to form easily and have excellent processibility, and which can be cured to provide products of soft to rock hard character, as well as in the intermediate range, all with good aging properties and desirable physical properties, such as tensile strength, elongation, shore hardness, and high tensile product (tensile strength multiplied by elongation) and a relatively low degree of water absorption.

Although improved hardness of polychloroprene compositions may be obtained by direct incorporation of thermosetting phenol-aldehyde resins, these resins are generally incompatible or only poorly so with polychloroprene and such compositions as a result have poor physical properties. I am, however, enabled to obtain polychloroprene compositions of enhanced physical properties, in accordance with the present invention, by first incorporating or dissolving cashew nut shell liquid modified phenolaldehyde resins with rubber-like butadiene-acrylonitrile copolymer, and thereafter incorporating this premix or solution with the polychloroprene.

Modification of phenol-aldehyde resins by means of cashew nut shell liquid, either in partial replacement of or in addition to the phenol employed in the conventional production of such resins is known to the art and forms no part of the present invention. It is also known to the art that these modified resins are compatible with and can be dissolved in butadiene-acrylonitrile copolymer. It is also known that this copolymer, per se, is compatible in all proportions with polychloroprene.

Thus, although the indicated resins are per se poorly compatible with polychloroprene, by first dissolving them in the indicated copolymer, the latter appears to act as a flux to make the resin more compatible with the polychloroprene and to result in compositions thereof of improved character.

For the purpose of illustration, and not limitation, the following is an example of a cashew nut shell liquid modified phenol aldehyde resin, suitable for use in the present invention and its method of manufacture:

| | Parts by weight |
|---|---|
| Phenol | 420 |
| Conc. sulfuric acid | 9.4 |
| 37% formaldehyde | 282 |
| Cashew nut shell liquid | 25.5 |
| Bodied linseed oil | 51 |
| Low boiling xylenols | 46 |

The phenols and sulfuric acid are charged to a kettle, warmed to 150° F., and the formaldehyde added cautiously and the batch allowed to reflux for 15 to 30 minutes. The water is now distilled from the resin until a temperature of 280° F. is reached. At this point the cashew nut shell liquid and bodied oil are added and the temperature slowly raised to 450° F. At this time, vacuum distillation is begun and held until a grindable resin of desired melting point is reached. The resin is then poured, cooled and ground and blended with 5% to 8% hexamethylenetetramine. If desired added cashew nut shell liquid may be employed in substitution for the linseed oil and/or xylenols in the foregoing example. It will also be understood that in similar manner, as is well known in the art, the phenols may be, phenol per se, cresols, cresylic acid, xylenols and the like or their mixtures. Also the aldehyde component may be formaldehyde, paraformaldehyde, or other polymers of formaldehyde which react as formaldehyde. A similarly suitable, commercially obtainable, cashew nut shell liquid modified phenol-aldehyde resin is known as Durez 12687 manufactured by Durez Plastics and Chemicals, Inc.

In preparing the pre-mix of the cashew nut shell liquid modified phenol-aldehyde resin and butadiene-acrylonitrile copolymer, I prefer to employ from 1 to 2 parts of the resin to 1 part by weight of the copolymer. Higher resin contents are difficult to handle on a plant mill and lower concentrations mean the addition of a large amount of another elastomer not required in polychloroprene blends. Although no plasticizers are required where the resin is highly compatible with the copolymer, use of a plasticizer is desirable in practical compounding so that excessive temperatures are not reached, and to enable production of more homogeneous blends or solutions at a lower processing temperature. For this purpose the ester-type plasticizers, glycols, and in general acetone soluble plasticizers are of aid in fluxing the resin into the copolymer at normal processing temperatures.

In the ultimate composition, I have found that the greatest overall advantages may be obtained by employing from about 1% to about 10% by weight of the modified resin on the polychloroprene, although up to about 50% may be employed if very hard stocks are desired. In the indicated lower range the addition of the resin in small amounts causes a progressive increase in tensile strength and a large amount of hardening, and although further addition of resin up to 50% increases hardness, the proportionate increase with each per cent addition of resin above about 10% is not as great.

The following is an example of a pre-mix or masterbatch for dispersing or dissolving the resin in the copolymer, for the purpose of illustration and not limitation:

EXAMPLE 1

Ten parts by weight of butadiene-acrylonitrile copolymer (such as Paracril 26 NS90) is first broken down on a tight, cold, conventional two roll rubber mill until relatively smooth, and then 2 parts by weight of liquid plasticizer is added, preferably one of the ester types, such as dibutyl sebacate. After the plasticizer is incorporated, the stock is slabbed off the mill and allowed to cool. After thorough cooling, usually overnight, the stock is again added to the cold mill and 20 parts by weight of the modified resin is mixed in as quickly as possible to obtain a homogeneous blend or solution, but without causing the resin to become thermoset or cured at this time. The batch is then slabbed off, cooled under water, and stored for later use. Successful batches may also be made in internal mixers such as a Banbury.

A batch of neoprene composition was separately prepared on a mill of the following composition:

EXAMPLE 2

| | Parts by weight |
|---|---|
| Polychloroprene | 400 |
| Carbon black | 200 |
| Magnesium oxide | 8 |
| Zinc oxide | 20 |
| Stearic acid | 2 |
| Sulfur | 6 |
| Triphenylguanidine | 2 |
| Light petroleum base oil | 20 |
| | 658 |

The compositions of Examples 1 and 2 are thereafter milled together and may be shaped or molded as desired, and cured in conventional manner.

The following table illustrates the properties of compositions prepared in accordance with the present invention, compared to use of the same composition, but wherein the resin and copolymer are directly added to the neoprene batch without pre-blending: Column A describes the properties of a composition wherein the copolymer contained 28% acrylonitrile, and wherein 32 parts by weight of the resin and copolymer composition of Example 1 was pre-blended and then mixed with 658 parts by weight of the neoprene batch of Example 2. Column B likewise shows the properties of the same composition with the exception that all components were mixed together, that is the modified resin and copolymer were mixed with the neoprene composition without pre-blending.

Table

| | Pre-Mix A | Direct Mix B |
|---|---|---|
| 30 minute cure at 320° F.: | | |
| Ultimate tensile strength | 2,267 | 1,760 |
| Elongation at break | 267 | 217 |
| Shore hardness "A" | 76 | 75 |
| Tensile product X10$^4$ | 60.8 | 38.6 |
| 60 minute cure at 320° F.: | | |
| Ultimate tensile strength | 2,042 | 1,562 |
| Elongation at break | 192 | 150 |
| Shore hardness "A" | 80 | 82 |
| Tensile product X10$^4$ | 39.2 | 23.4 |

It will readily be seen by comparing the tensile products of the two methods of resin incorporation that my pre-blending produces a superior neoprene vulcanizate.

I claim as my invention:

1. The method of improving the physical properties of a polychloroprene composition, which comprises incorporating with polychloroprene from about 1% to about 50% by weight thereof of a pre-blended mixture comprised of one part by weight of butadiene-acrylonitrile copolymer and from about one to about two parts by weight of cashew nut shell liquid modified phenol-aldehyde resin.

2. The method of incorporating cashew nut shell liquid modified phenol-aldehyde resin with polychloroprene, which comprises pre-milling from about one to about two parts by weight of said resin with one part by weight of butadiene-acrylonitrile copolymer and then milling said pre-milled composition with the polychloroprene in an amount to provide from about 1% to about 50% of resin by weight of the chloroprene.

3. The method of incorporating cashew nut shell liquid modified phenol-aldehyde resin with polychloroprene, which comprises pre-milling from about 1 to about 2 parts by weight of said resin with one part by weight of butadiene-acrylonitrile copolymer and then milling said pre-milled composition with the polychloroprene in an amount to provide from about 1% to about 10% of resin by weight of the polychloroprene.

4. A product formed in accordance with the composition of claim 3.

ROBERT L. HOLMES.

References Cited in the file of this patent

UNITED STATES PATENTS

| Number | Name | Date |
|---|---|---|
| 2,459,739 | Groten et al. | Jan. 18, 1949 |
| 2,459,874 | Fay, Jr. | Jan. 25, 1949 |
| 2,532,374 | Shepard et al. | Dec. 5, 1950 |